(12) United States Patent
Wier

(10) Patent No.: US 7,350,733 B2
(45) Date of Patent: Apr. 1, 2008

(54) BELT TENSIONER FOR A SAFETY BELT RETRACTOR

(75) Inventor: Franz Wier, Goeggingen (DE)

(73) Assignee: TRW Automotive GmbH & Co. Kg, Alfdorf (DE)

( * ) Notice: Subject to any disclaimer, the term of this patent is extended or adjusted under 35 U.S.C. 154(b) by 346 days.

(21) Appl. No.: 11/034,469

(22) Filed: Jan. 13, 2005

(65) Prior Publication Data
US 2005/0156073 A1 Jul. 21, 2005

(30) Foreign Application Priority Data
Jan. 16, 2004 (DE) .................. 10 2004 002 428

(51) Int. Cl.
B65H 75/48 (2006.01)
(52) U.S. Cl. ........................ 242/374; 74/425
(58) Field of Classification Search .............. 242/374; 280/806; 297/478; 74/425; 60/638
See application file for complete search history.

(56) References Cited

U.S. PATENT DOCUMENTS 5,050,814 A * 9/1991 Butenop et al. ............ 242/374
5,284,307 A * 2/1994 Kotama ..................... 242/374
5,294,150 A * 3/1994 Steffens, Jr. ............. 280/801.2
5,772,246 A * 6/1998 Gordon ...................... 208/806
5,956,954 A * 9/1999 Schmid ........................ 60/636
6,224,008 B1 * 5/2001 Smithson et al. ........... 242/374
6,450,435 B2 * 9/2002 Junker et al. ............... 242/374
6,698,677 B1 * 3/2004 Happ et al. ................. 242/374

FOREIGN PATENT DOCUMENTS

| DE | 3817042 | 12/1988 |
| DE | 3903148 | 8/1990 |
| DE | 4224324 | 1/1993 |
| WO | WO 90/11913 | * 10/1990 |

* cited by examiner

Primary Examiner—Peter M. Cuomo
Assistant Examiner—Sang Kim
(74) Attorney, Agent, or Firm—Tarolli, Sundheim, Covell & Tummino LLP

(57) ABSTRACT

A belt tensioner for a safety belt comprises a housing in which a piston is displaceable, and an exit port, wherein the exit port is arranged in the wall of the housing.

10 Claims, 7 Drawing Sheets

BELT TENSIONER FOR A SAFETY BELT RETRACTOR

BACKGROUND OF THE INVENTION

A belt tensioner of this type is known from DE 297 10 011. The piston is shiftable in the housing from an initial position along an operating stroke under the effect of compressed gas generated by a gas generator after its activation. This movement of the piston is transferred to a belt reel by a toothing mounted at the piston and a pinion engaging therein, which is connected to the belt reel. The rotation of the belt reel serves to remove the so-called belt slack from the safety belt system. In the belt tensioner known, the exit port is arranged in the bottom of the piston. Its purpose is to reduce the pressure existing in the housing of the belt tensioner, this pressure existing after the piston has travelled its operating stroke. A pressure possibly existing would counteract a return movement of the piston. This return movement of the piston, however, is desirable and necessary when after the belt tensioning a reverse rotation of the belt reel is carried out, in which safety belt is released for the purpose of the force limitation.

It is disadvantageous in the case of the belt tensioner known that also during the operating stroke a certain portion of the compressed gas escapes through the exit port. This loss reduces the tensioning efficiency.

It is the object of the invention to further develop a belt tensioner of the aforementioned kind to the effect that a higher tensioning efficiency is achieved.

BRIEF DESCRIPTION OF THE INVENTION

For this purpose it is provided for in accordance with the invention in a belt tensioner of the aforementioned kind that the exit port is arranged in the wall of the housing. In this manner a "slide valve" is formed together with the piston. When the piston is in the initial position, the exit port is located "behind" the piston. Although the exit port as such is not closed, no compressed gas can escape.

It is not until the piston has been shifted by the compressed gas to such an extent that it has opened the exit port that the compressed gas may emerge through the exit port. In this way it is ensured that the side of the piston facing the gas generator is substantially free of pressure after the piston has travelled its operating stroke. Thus, the piston may, for example in the case of a reverse rotation of the belt reel for the purpose of the force limitation, be moved towards its initial position without resistance.

Advantageous designs of the invention will be apparent from the sub-claims.

BRIEF DESCRIPTION OF THE DRAWINGS

The invention is described in the following with the aid of a preferred embodiment represented in the accompanying drawings, in which.

DETAILED DESCRIPTION OF THE INVENTION

Figure 1:
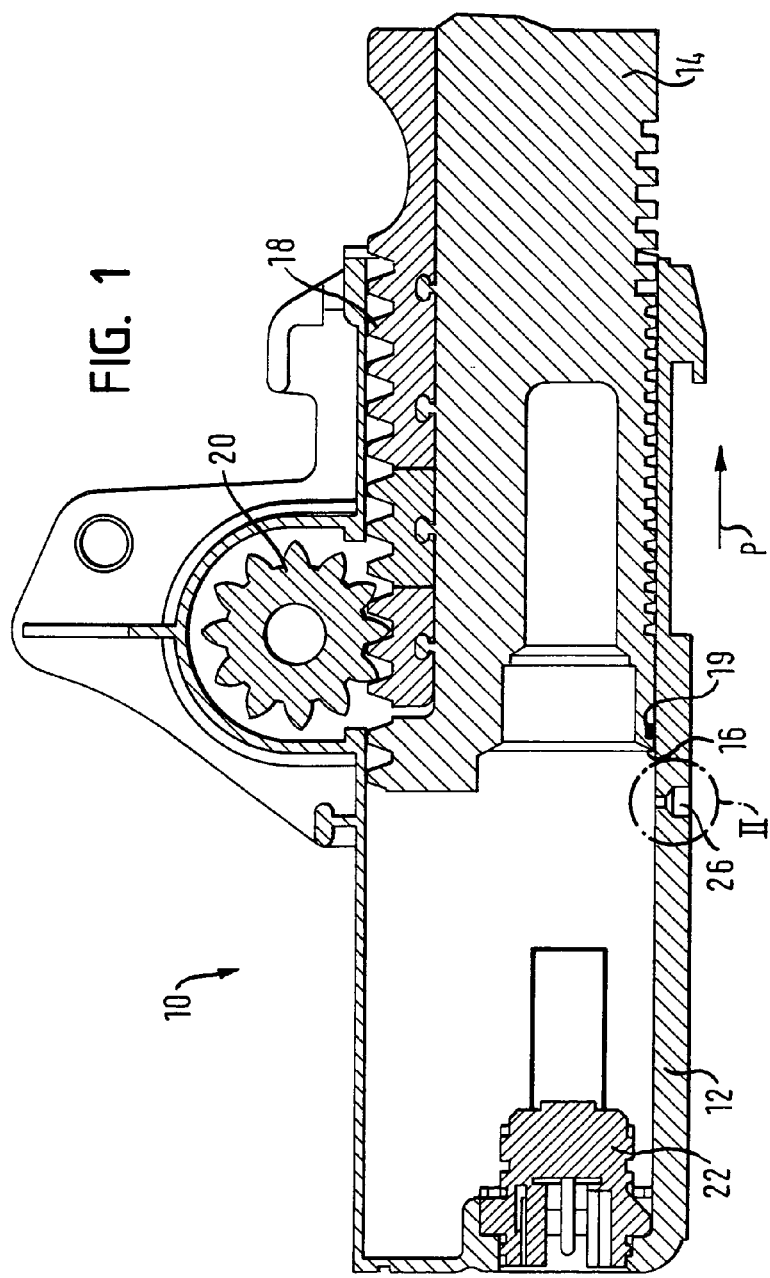
FIG. 1 shows a longitudinal section through a belt tensioner in accordance with a first embodiment of the invention.
Figure 2:
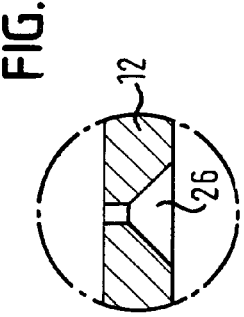
FIG. 2 shows on an enlarged scale section II of FIG. 1.

In FIG. 1 there is shown a belt tensioner 10 comprising a housing 12 in which a piston 14 is displaceably arranged. The piston 14 comprises a piston bottom 16 as well as a toothing 18 on its outside. In the region of the piston bottom 16 there is provided a seal 19 which defines together with the wall of the housing 12 a pressure chamber on the left side of the piston 14 with regard to FIG. 1. A pinion 20 engages in the toothing 18, the pinion being coupled to a belt reel of a belt tensioner. The toothing 18 and the pinion 20 serve to convert a translatory displacement of the piston 14 within the housing 12 in the direction of the arrow P into a rotation of the belt reel. A movement of the piston 14 within the housing 12 is caused by compressed gas generated by a gas generator 22. After ignition of the gas generator this compressed gas acts onto the bottom surface 16 of the piston which is displaced to the right from an initial position in which the piston bottom 16 is located at the left end of the housing 12 with regard to FIG. 1.

Figure 3:
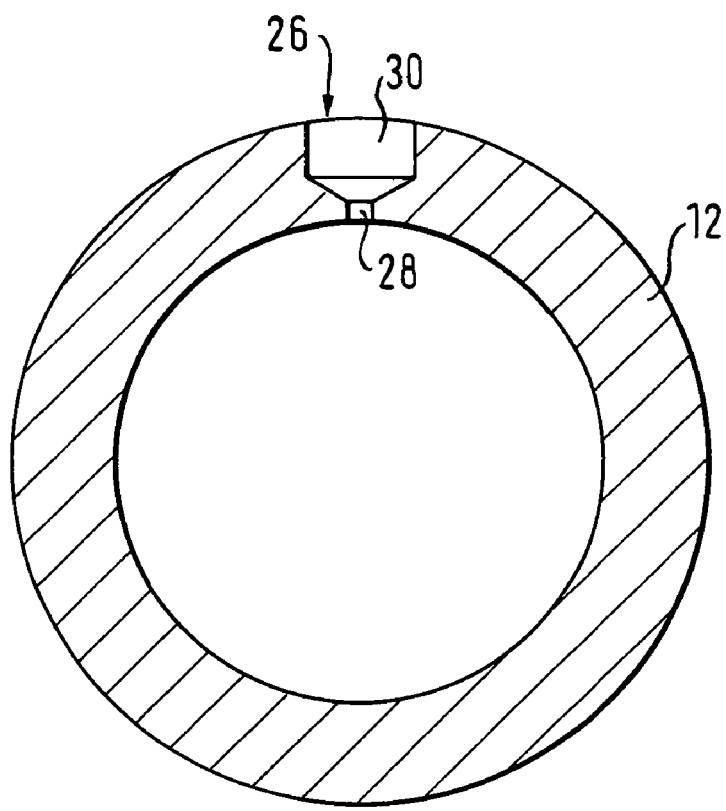
FIG. 3 shows a cross section through the housing of the belt tensioner at the level of the exit port.

In the wall of the housing 12 an exit port 26 is formed. This exit port consists of a fusible section 28 (see FIG. 3) having a comparatively narrow cross section and an outflow section 30 having a considerably larger cross section than the fusible section 28. The exit port 26 is arranged at the housing 12 in a comparatively great distance from the gas generator 22 so that the pressure chamber formed by the housing 12 and the piston 14 together with its seal 24 and widening during the operating stroke does not reach the exit port 26 until the seal 24 "runs over" the exit port, which means the piston 14 has already travelled the major part of its operating stroke. Only in this case the compressed gas existing in the pressure chamber can escape through the exit port. This means in the opposite case that no pressure losses at all occur before, which ensures a high tensioning efficiency.

The exit port 26 is configured in such a manner that the hot compressed gas flowing through it with a high speed melts off the material at the edge of the fusible section 28 of the exit port 26 so that the cross section of the fusible section 28 and thus of the exit port 26 very rapidly increases to at least three to six times the original cross section.

Figure 4:
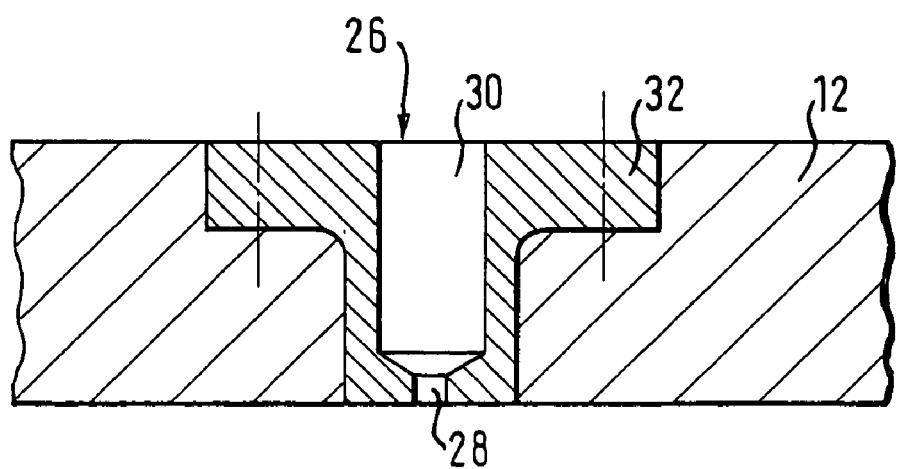
FIGS. 4 to 9 show various variants of embodiments of the exit port.

In FIG. 4 there is shown an embodiment in which the exit port 26 is formed in a separate material insert 32 which is attached to the wall of the housing 12. In this manner the material in which the exit port 26 is formed can be adapted in the best possible way to the fusible behaviour desired.

Figure 5:
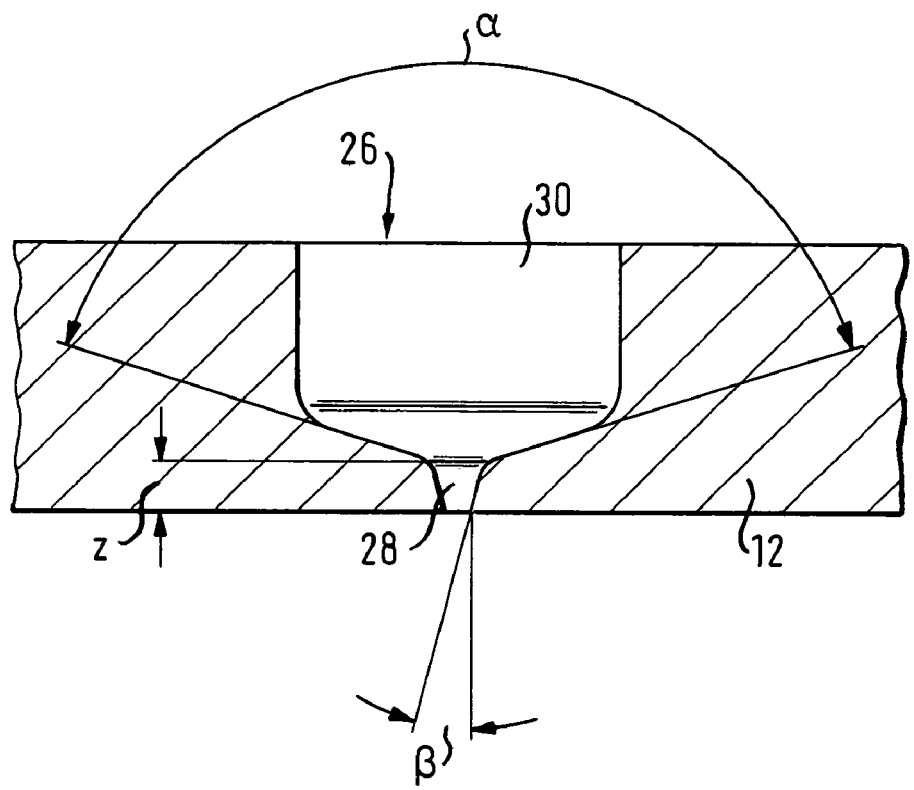
Figure 6:
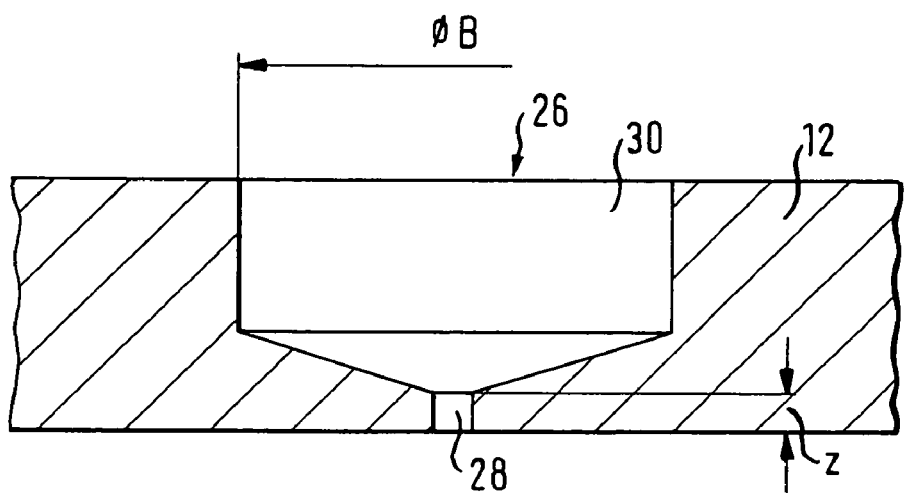

In FIGS. 5 and 6 there is shown an embodiment in which the exit port 26 is directly embodied in the material of the wall of the housing 12. This material preferably is a metal diecasting alloy. Particularly suited is a material having a low melting point such as zinc. This ensures that the exit port very rapidly enlarges and the pressure in the pressure chamber is reduced correspondingly quickly.

In FIGS. 5 and 6 there are shown further embodiments of the exit port. In both embodiments the fusible section 28 has a diameter of approx. 1 mm, the length z of the fusible section amounting to about 0.4 mm. In the embodiment of FIG. 5 the fusible section 28 is conically configured, the cone enlarging outwardly. The cone angle β amounts to less than 30°. The transition between the fusible section 28 and the outflow section 30 is also conically configured, the angle α being somewhat smaller than 170°. The diameter of the outflow section 30 clearly amounts to more than three times the diameter of the fusible section 28.

When the hot compressed gas flows through the fusible section 28, its diameter melts open within a very short period of time, in particular quicker than within 20 ms, to a diameter of approx. 2.7 mm. This ensures that in a return movement of the piston 14 the remaining pressure can escape without great resistance so that a force limitation function is not impaired.

Figure 7:
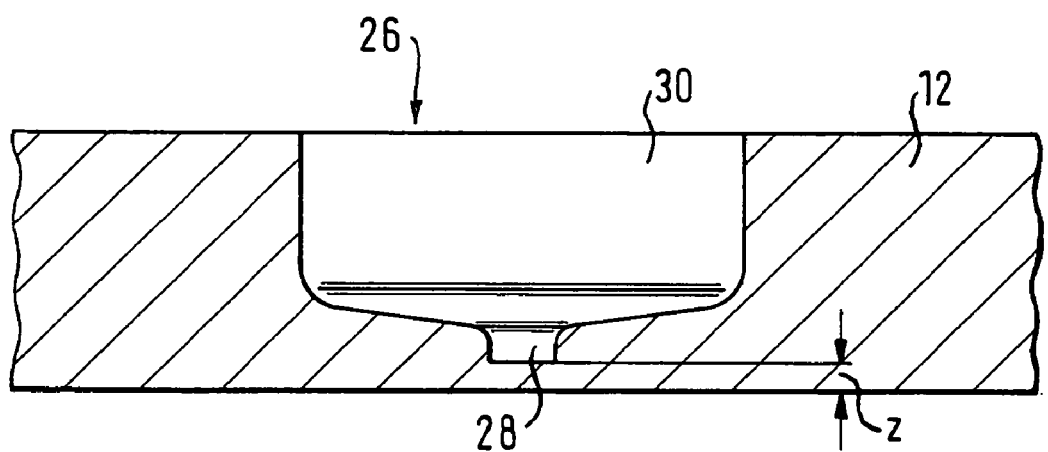

In FIG. 7, an alternative embodiment of the exit port is shown. In contrast to the exit ports shown in FIGS. 5 and 6, fusable section 28 is formed with a closed bottom surface which acts as a bursting membrane. As soon as the pressure acting on the bursting membrane is sufficient for the bursting membrane being destroyed, the exit port is opened so as to allow the pressurized gas to escape from the belt tensioner.

Figure 8:
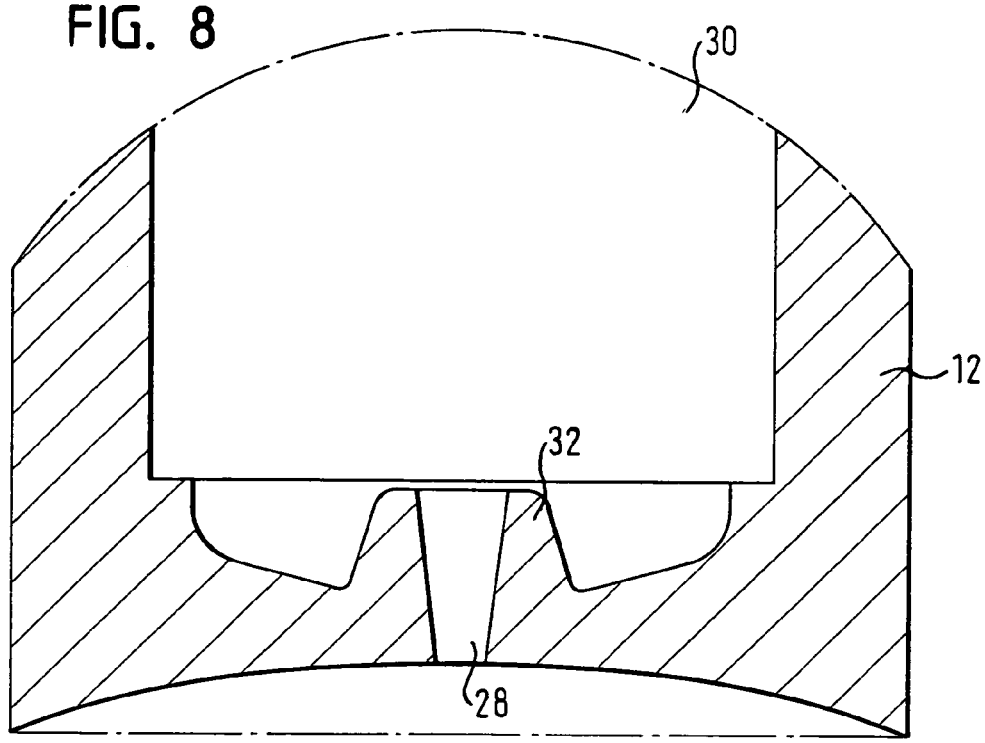
Figure 9:
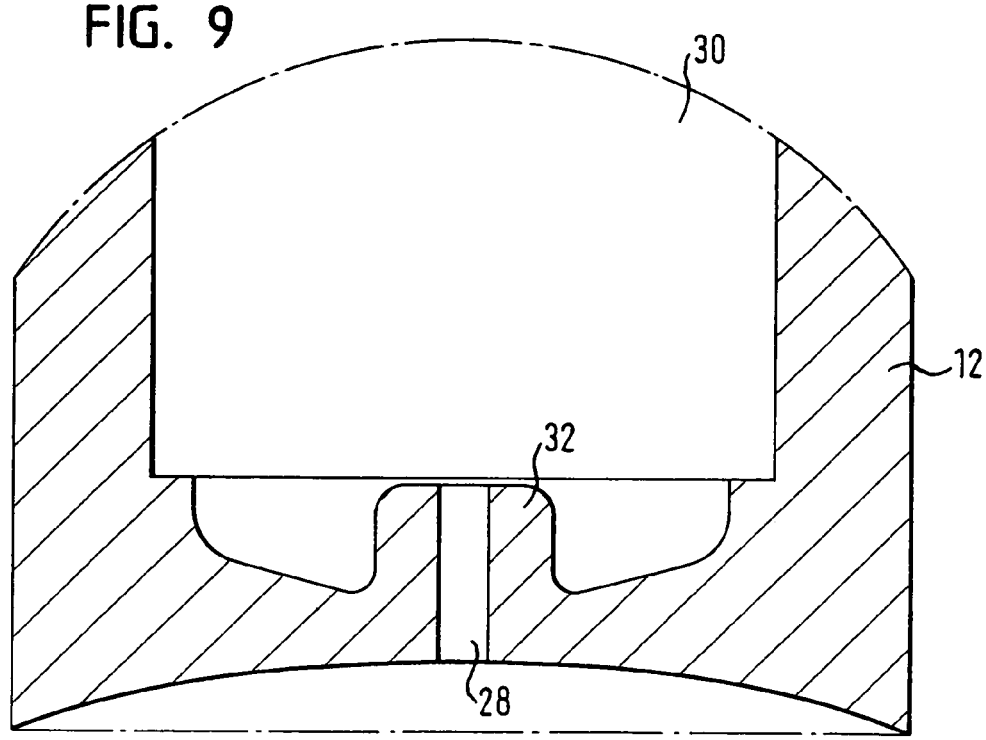

Two further embodiments are shown in FIGS. 8 and 9. These embodiments differ from the preceding ones by a material accumulation 32 projecting in the form of a collar towards the outflow section 30. The fusible section 28 is configured in this arrangement with a very small diameter of for example 0.2 mm. This results in that at the beginning of the through flow through the exit port 26 the cross section widens only slowly, because on account of the material accumulation 32 at first a very large amount of material has to be melted off. However, as soon has this has been accomplished, the transition to a thinner material cross section ensues so that the increase in cross section takes place then more rapidly. In this manner the change of the overall cross section may be adjusted such that for example in the first 5 ms the pressure escapes comparatively slowly and subsequently there is a larger pressure drop.

Figure 10:
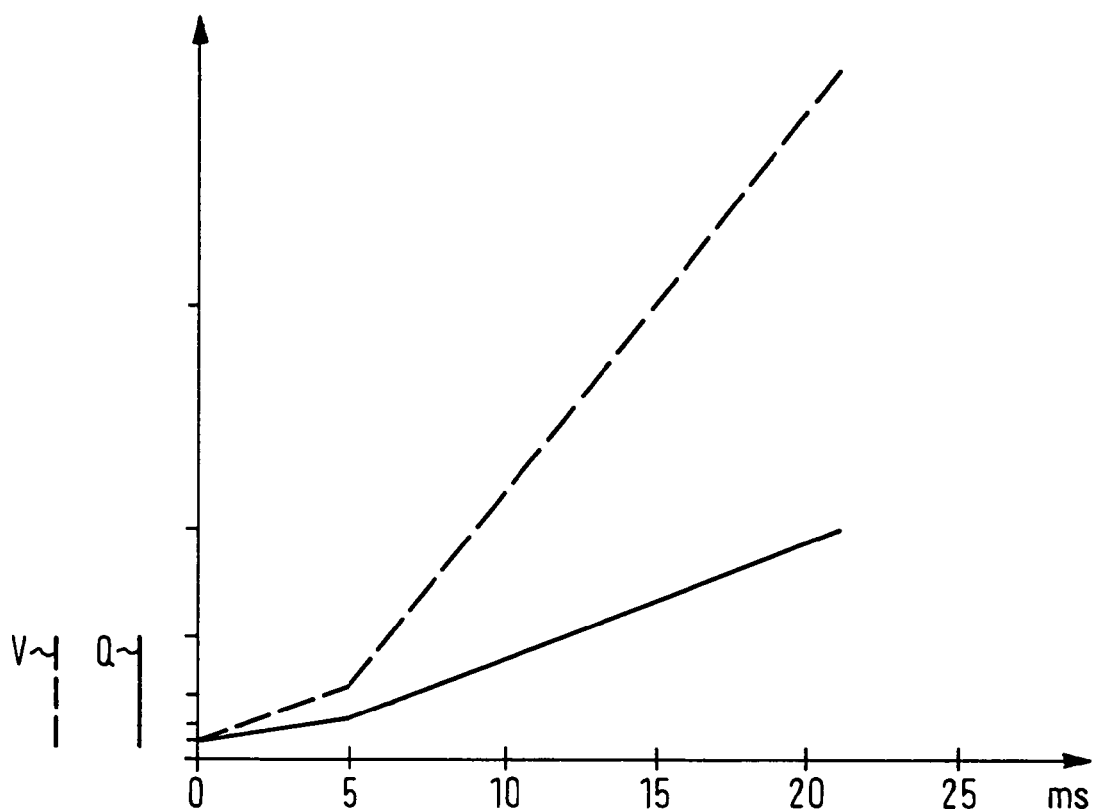
FIG. 10 shows a diagram of the cross section of the exit port as well as of the volume with time emerging through the exit port.

In FIG. 10 there is represented a diagram in which the cross section Q of the exit port, in particular defined by the cross section of the section 28, as well as the volume V emerging through the exit port 26 is shown. It is clearly apparent that after 5 ms the increase in cross section augments so that a volume flow augmenting disproportionately is obtained.

Figure 12:
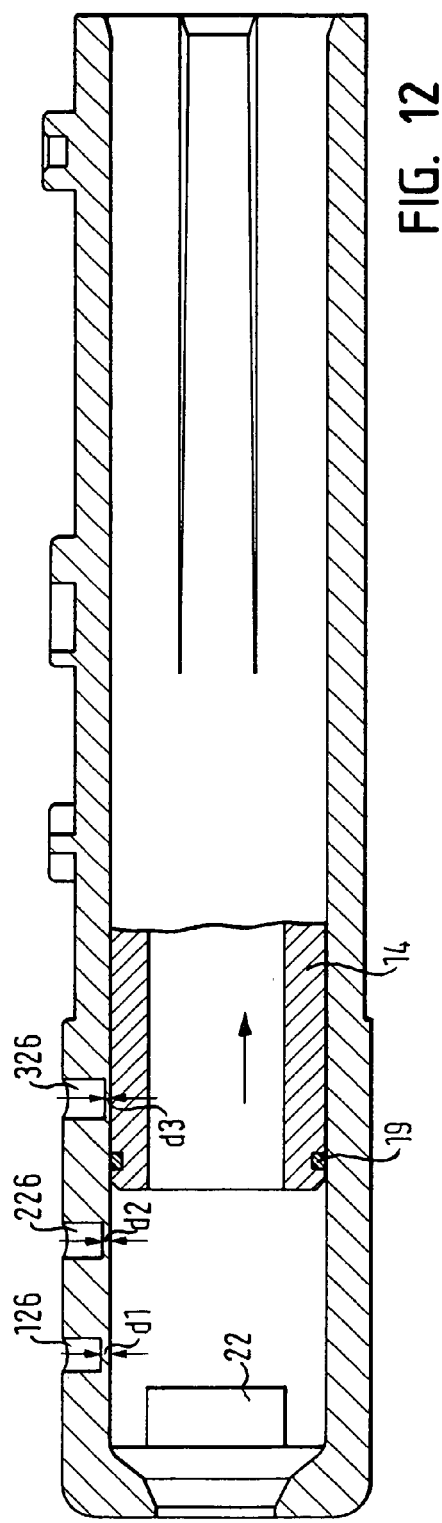
FIG. 12 shows a section of plane XII-XII of FIG. 11.
Figure 11:
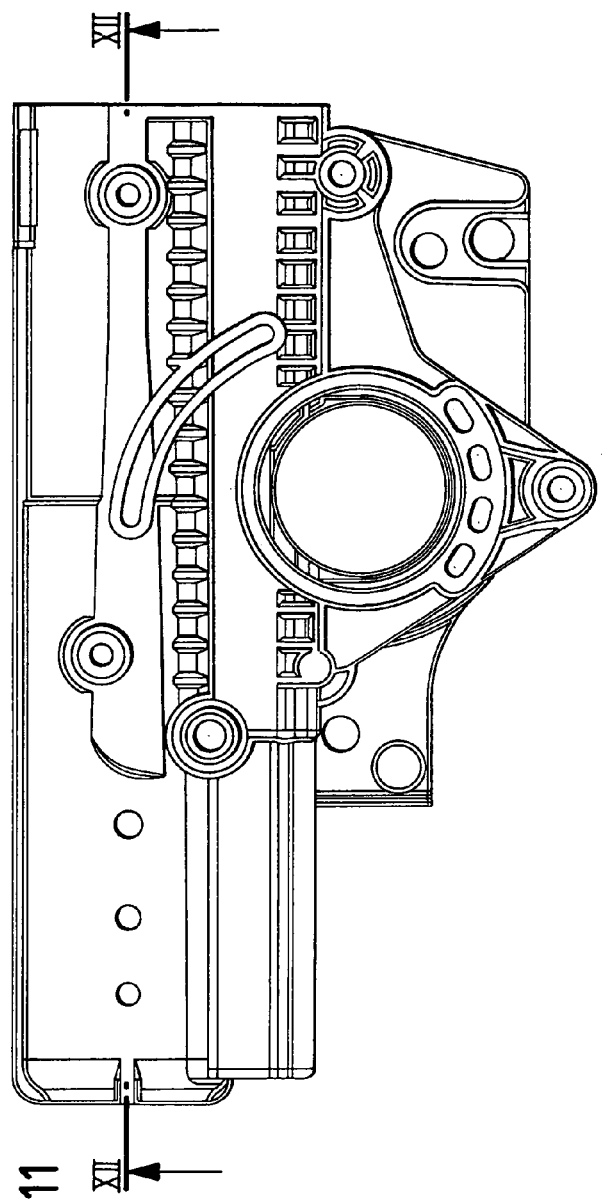
FIG. 11 shows a side view of a belt tensioner in accordance with a second embodiment of the invention.

FIGS. 11 and 12 show a belt tensioner according to a second embodiment of the invention. Here, three exit ports 126, 226 and 326 are used. The first exit port 126 is arranged comparatively close to gas generator 22 so that seal 19 of piston 14 runs over the first exit port after a comparatively small stroke. This stroke of the piston corresponds to a comparatively small length of webbing being retracted.

The second exit port 226 is arranged in a distance from the gas generator which is larger than in case of the first exit port. The second exit port is reached by the piston after a medium amount of webbing is retracted. The third gas exit port 326 is arranged in a distance from the gas generator which is larger than the distance of the second gas exit port. When piston 14 reaches the first gas exit port, a large amount of webbing has been retracted.

Each of the exit ports 126, 226, 326 has a closed bottom which is formed as a bursting membrane. As soon as seal 19 of piston 14 runs over the respective exit opening, the bursting membrane is subjected to the pressure in the interior of the belt tensioner, resulting in the bursting membrane being destroyed and pressure escaping through the respective exit opening. The wall thickness of the bursting membranes is chosen such that it decreases with increasing distance from the gas generator. As an example, wall thickness d1 of exit opening 126 is approximately 0.25 mm, whereas wall thickness d2 of exit opening 226 is approximately 0.2 mm. Finally, wall thickness d3 of exit opening 326 is approximately 0.15 mm. These wall thicknesses take into account that the pressure in the interior of the belt tensioner decreases with increasing piston stroke.

If the displacement of piston 14 is stopped due to the resistance exerted from the vehicle occupant on the seat belt being retracted, the pressure in the interior of the belt tensioner increases as the gas generator 22 continues to provide pressurized gas. Accordingly, pressure and temperature increase in the interior of the belt tensioner. The increasing temperature results in the bursting membranes being heated, which in turn results in decreasing strength of the material. Within a short period of time, the respective bursting membrane is destroyed by the pressure acting in the interior of the belt tensioner. Accordingly, the respective exit port is opened, and the pressure in the interior of the belt tensioner is released. A return movement of the piston unhindered by excessive pressure in the interior of the belt tensioner is now possible.

In a further embodiment, exit port 326 could be formed with a bore as is shown in the embodiments of FIGS. 4 to 6, 8 and 9 whereas exit ports 126, 226 are formed with bursting membranes. This ensures venting of the interior of the belt tensioner after the piston has travelled its entire stroke, without it being necessary that the pressure and the temperature present in the interior of the belt tensioner are sufficient for destroying the bursting membrane of exit port 326.

The invention claimed is:

1. A belt tensioner for a safety belt, comprising a housing in which a piston is displaceable, and an exit port, characterized in that said exit port is arranged in the wall of the housing, said exit port being formed of a material that can be melted off by compressed gas used for shifting said piston.

2. The belt tensioner according to claim 1, characterized in that said exit port is arranged such that said exit port is closed by said piston as long as said piston has not travelled a certain distance.

3. The belt tensioner according to claim 1, characterized in that said exit port is formed in a material insert.

4. The belt tensioner according to claim 1, characterized in that said exit port is directly formed in a material of said housing.

5. The belt tensioner according to claim 1, characterized in that said exit port consists of a narrow fusible section at an interior portion of said housing and a further outflow section at an exterior portion of said housing.

6. The belt tensioner according to claim 5, characterized in that said fusible section conically enlarges outwardly.

7. The belt tensioner according to claim 5, characterized in that said fusible section comprises a collar projecting into said outflow section.

8. The belt tensioner according to claim 1, characterized in that a material surrounding said exit port is a pressure diecasting material.

9. The belt tensioner according to claim 1, characterized in that said piston is provided with a discharge port which is arranged in a section integrally formed therewith.

10. The belt tensioner according to claim 1, characterized in that three of said exit ports are provided.

* * * * *